US012296775B2

(12) United States Patent
Hwangbo et al.

(10) Patent No.: US 12,296,775 B2
(45) Date of Patent: May 13, 2025

(54) SEAT AIRBAG FOR VEHICLE

(71) Applicant: HYUNDAI MOBIS CO., LTD., Seoul (KR)

(72) Inventors: Sang Won Hwangbo, Yongin-si (KR); Choong Ryung Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 153 days.

(21) Appl. No.: 17/826,937

(22) Filed: May 27, 2022

(65) Prior Publication Data

US 2022/0388472 A1  Dec. 8, 2022

(30) Foreign Application Priority Data

Jun. 3, 2021  (KR) .................. 10-2021-0072221
Jun. 4, 2021  (KR) .................. 10-2021-0072923

(51) Int. Cl.
*B60R 21/233*  (2006.01)
*B60R 21/00*   (2006.01)
(Continued)

(52) U.S. Cl.
CPC .......... *B60R 21/233* (2013.01); *B60R 21/207* (2013.01); *B60R 21/23138* (2013.01);
(Continued)

(58) Field of Classification Search
CPC ............... B60R 21/233; B60R 21/207; B60R 21/23138; B60R 21/2338;
(Continued)

(56) References Cited

U.S. PATENT DOCUMENTS 10,556,563 B2 *  2/2020  Song ................... B60R 21/2338
10,870,408 B2 * 12/2020  Garnier ................ B60R 21/207
10,960,841 B2 *  3/2021  Deng .................. B60R 21/2338
(Continued)

FOREIGN PATENT DOCUMENTS

DE  102020109466 A1 *  4/2021  .......... B60R 21/207
JP  2007-084014 A      4/2007
(Continued)

OTHER PUBLICATIONS

KR-20190126213-A (machine translation) (Year: 2019).*
(Continued)

*Primary Examiner* — Jason D Shanske
*Assistant Examiner* — Joselynn Y Sliteris
(74) *Attorney, Agent, or Firm* — Novo TechIP International PLLC

(57) ABSTRACT

Disclosed is a seat airbag for a vehicle, the seat airbag including an airbag cushion including lateral cushions configured to be deployed forward from lateral sides of a seatback, and front cushions bent and extending from front ends of the lateral cushions toward a seat center and positioned at a front side of the passenger, and support tethers configured to connect upper portions of the front cushions and an upper portion of the seatback or connect lower portions of the front cushions and a lower portion of the seatback so that the front cushions support a passenger when the passenger is loaded onto the front cushions.

16 Claims, 16 Drawing Sheets

(51) Int. Cl.
  *B60R 21/207*  (2006.01)
  *B60R 21/231*  (2011.01)
  *B60R 21/2338* (2011.01)
(52) U.S. Cl.
  CPC ............. *B60R 21/2338* (2013.01); *B60R 2021/0004* (2013.01); *B60R 2021/0006* (2013.01); *B60R 2021/23107* (2013.01); *B60R 2021/23146* (2013.01); *B60R 2021/23386* (2013.01)
(58) Field of Classification Search
  CPC .... B60R 2021/0004; B60R 2021/0006; B60R 2021/23107; B60R 2021/23146; B60R 2021/23386
  See application file for complete search history.

(56) References Cited

U.S. PATENT DOCUMENTS

| | | | | |
|---|---|---|---|---|
| 11,505,153 B2* | 11/2022 | Fuma | ................. | B60R 21/2338 |
| 11,584,329 B2* | 2/2023 | Sung | .................... | B60R 21/207 |
| 11,584,330 B2* | 2/2023 | Lee | ..................... | B60R 21/2165 |
| 11,590,920 B2* | 2/2023 | Schneider | ............ | B60R 21/233 |
| 11,851,018 B2* | 12/2023 | Sung | .................... | B60R 21/239 |
| 11,851,019 B2* | 12/2023 | Sung | .................... | B60R 21/239 |
| 2020/0406855 A1* | 12/2020 | Saito | ................... | B60R 21/207 |
| 2021/0354653 A1* | 11/2021 | Lee | ........................ | B60R 21/233 |
| 2021/0354654 A1* | 11/2021 | Lee | ........................ | B60R 21/261 |
| 2021/0402949 A1* | 12/2021 | Sung | .................. | B60R 21/2338 |
| 2022/0063547 A1* | 3/2022 | Lee | ..................... | B60R 21/2342 |
| 2022/0111818 A1* | 4/2022 | Schneider | ........... | B60R 21/2334 |
| 2022/0274555 A1* | 9/2022 | Matsushita | ........... | B60R 21/207 |
| 2023/0106061 A1* | 4/2023 | Hwangbo | ............. | B60R 21/233 |
| | | | | 280/730.2 |
| 2023/0256930 A1* | 8/2023 | Weimer | ............ | B60R 21/23138 |
| | | | | 280/729 |

FOREIGN PATENT DOCUMENTS

| | | | |
|---|---|---|---|
| KR | 20190126213 A | * | 11/2019 |
| KR | 102096850 B1 | * | 4/2020 |
| WO | WO-2020141737 A1 | * | 7/2020 |

OTHER PUBLICATIONS

WO-2020141737-A1 (machine translation) (Year: 2020).*
KR-102096850-B1 (machine translation) (Year: 2020).*
DE-102020109466-A1 (machine translation) (Year: 2021).*

* cited by examiner loading

SEAT AIRBAG FOR VEHICLE

CROSS-REFERENCE TO RELATED APPLICATIONS

The present application claims priority to Korean Patent Application No. 10-2021-0072221, filed on Jun. 3, 2021, and to Korean Patent Application No. 10-2021-0072923, filed on Jun. 4, 2021. Each of these applications is incorporated herein in its entirety for all purposes by this reference.

BACKGROUND

1. Technical Field

The present invention relates to a seat airbag for a vehicle, which is deployed while surrounding a passenger to minimize injury to an occupant by absorbing impact applied to the occupant and restraining the occupant in the event of a collision accident of a vehicle.

2. Discussion of Related Art

Technologies related to vehicles have been developed to ensure the safety of occupants in addition to traveling performance, convenience, and functions.

In particular, among various safety devices mounted in the vehicle, an airbag is applied as the most efficient means for protecting the occupant from impact.

The airbag is a means for protecting a driver and an occupant in the event of a vehicle collision and includes a collision sensor configured to detect a vehicle collision, a controller configured to operate the airbag on the basis of the detection result of the collision sensor, and an airbag module configured to operate the airbag on the basis of a signal from the controller. The airbags are classified into a driver airbag, a front passenger airbag, a side airbag, a roof airbag, and the like depending on installation positions or object to be protected.

In particular, in the event of a broadside collision, the upper bodies of the occupants seated in the driver seat and the passenger seat move and collide with each other or collide with armrests, seats, and the like, which causes injuries to the occupants.

Further, if the occupant does not fasten a safety belt, the occupant's body excessively moves forward, and great impact is applied to the occupant even though a front airbag is deployed. In addition, even though the occupant fastens the safety belt, the occupant's body is rotated and bent by inertia, which causes a collateral injury to the occupant.

A seat airbag configured to surround the passenger is provided to prevent the collateral injury. However, there is a problem in that the passenger slips out between the seat and the airbag when the passenger is loaded in a state in which the seat airbag surrounds the passenger.

The foregoing explained as the background is intended merely to aid in the understanding of the background of the present invention, and is not intended to mean that the present invention falls within the purview of the related art that is already known to those skilled in the art.

SUMMARY

The present invention is proposed to solve these problems and aims to provide a seat airbag, in which a support tether configured to support an airbag cushion mounted in a seat connects an upper portion of a front cushion of the airbag cushion to an upper portion of a seatback and connects a lower portion of the front cushion to a lower portion of the seatback, thereby preventing a passenger from separating from the airbag cushion.

An embodiment of the present invention provides a seat airbag for a vehicle, the seat airbag including: an airbag cushion including lateral cushions configured to be deployed forward from lateral sides of a seatback, and front cushions bent and extending from front ends of the lateral cushions toward a seat center and positioned at a front side of the passenger; and support tethers configured to connect upper portions of the front cushions and an upper portion of the seatback or connect lower portions of the front cushions and a lower portion of the seatback so that the front cushions support a passenger when the passenger is loaded onto the front cushions.

The front cushion may include: a bent portion bent from the front end of the lateral cushion; and an extension portion extending from the bent portion toward a center of the seat, and the support tether may include: an upper tether configured to connect an upper portion of the bent portion and an upper portion of the extension portion to the upper portion of the seatback; and a lower tether configured to connect a lower portion of the bent portion and a lower portion of the extension portion to the lower portion of the seatback.

The upper tether may have one end fixed to the seatback and the other end divided and connected to the upper portion of the bent portion and the upper portion of the extension portion.

The lateral cushion, the front cushion, and the support tether may be respectively provided as a pair of lateral cushions, a pair of front cushions, and a pair of support tethers, which are symmetrically disposed at two opposite sides of the seatback, and one end of the upper tether may be connected to positions on the seatback, which are spaced apart from each other in a leftward/rightward direction of a vehicle.

The lateral cushion, the front cushion, and the support tether may be respectively provided as a pair of lateral cushions, a pair of front cushions, and a pair of support tethers, which are symmetrically disposed at two opposite sides of the seatback, and the upper tethers may intersect each other at one end thereof and be connected to the seatback.

The upper tether may be provided in plural and include: a first tether having one end fixed to the seatback and the other end connected to the upper portion of the bent portion; and a second tether having one end fixed to the seatback and the other end connected to the upper portion of the extension portion.

The lateral cushion, the front cushion, and the support tether may be respectively provided as a pair of lateral cushions, a pair of front cushions, and a pair of support tethers, which are symmetrically disposed at two opposite sides of the seatback, the pair of first tethers may be connected to the seatback so that the pair of first tethers intersect each other at one end thereof, and the pair of second tethers may be spaced apart from each other in a leftward/rightward direction of the vehicle and connected to the seatback.

One end of the lower tether may be connected to a lateral lower portion of the seatback, and the other end of the lower tether may be divided and connected to the lower portion of the bent portion and the lower portion of the extension portion.

The support tether may include: a cover portion configured to surround an outer side of the front cushion; an upper support portion extending from an upper portion of the cover portion and connected to the upper portion of the seatback; and a lower support portion extending from a lower portion of the cover portion and connected to the lower portion of the seatback, and the cover portion may be connected to the front cushion by sewing.

The cover portion may include a slit formed in a portion where the front cushion is bent, and the slit may extend in an upward/downward direction.

The front cushion may include: a bent portion bent from a front end of the lateral cushion; and an extension portion extending from the bent portion toward a center of a seat, the upper support portion may be provided in plural, the plurality of upper support portions respectively may extend from an upper portion of the bent portion and an upper portion of the extension portion and be connected to the upper portion of the seatback, the lower support portion may be provided in plural, and the plurality of lower support portions respectively may extend from a lower portion of the bent portion and a lower portion of the extension portion and be connected to the lower portion of the seatback.

The front cushion may include: a bent portion bent from a front end of the lateral cushion; and an extension portion extending from the bent portion toward a center of a seat, the cover portions may include: a lateral portion configured to cover the bent portion; and a front portion configured to cover the extension portion, and the upper support portion and the lower support portion respectively may extend upward and downward from the lateral portion and the front portion.

The support tether may be provided in plural and have a line shape, and the plurality of support tethers may extend toward the airbag cushion at different angles.

The support tethers may include: main tethers each having one end connected to the upper portion of the seatback and the other end connected to the lower portion of the seatback, the main tether being connected to the airbag cushion on an extension line of an imaginary line connecting connection points on the upper and lower portions of the seatback; and auxiliary tethers disposed inside or outside the main tether and connected to the airbag cushion.

One or more auxiliary tethers may branch off from the main tether and be connected to the front cushion or the lateral cushion of the airbag cushion, and ends of the auxiliary tethers may be connected to the main tether again.

One or more auxiliary tethers may branch off at a side adjacent to the head of the passenger and be connected to the airbag cushion.

The auxiliary tethers may include: a first tether disposed inside the main tether and connected to the front cushion of the airbag cushion; and a second tether disposed outside the main tether and connected to the lateral cushion of the airbag cushion, and the auxiliary tethers may support a load of the passenger in a forward, transverse, or diagonal direction.

A reinforcing material may be inserted into an end of the first tether based on width direction, which is adjacent to the passenger.

The airbag cushion and the support tether may be respectively provided as a pair of airbag cushions and a pair of support tethers configured to be deployed symmetrically at two opposite sides of the seat.

The support tethers may intersect each other at one end thereof and be connected to the upper portion of the seatback.

According to the seat airbag for a vehicle according to the present invention, the airbag cushion includes the lateral cushions and the front cushions so as to protect the lateral sides and the front side of the passenger. The support tether having a surface shape connect the upper portion of the bent portion of the front cushion and the upper portion of the extension portion, which extends from the bent portion toward the front side of the passenger, to the upper portion of the seatback. Further, the support tether connects the lower portion of the bent portion and the lower portion of the extension portion to the lower portion of the seatback. Therefore, the support tether may support the front and lateral portions to prevent the passenger from slipping out between the front portions when the passenger is loaded, thereby reducing injury to the passenger.

In addition, according to the seat airbag for a vehicle according to another embodiment of the present invention, the airbag cushion may be provided to surround the passenger. The plurality of linear support tethers may be disposed in different directions and support the airbag cushion, which makes it possible to safely protect the passenger even though the passenger is loaded in various directions.

In addition, the support tether having a line shape, together with the surface-shaped support tether, may support the airbag cushion, which makes it possible to increase the force for supporting the airbag cushion.

DETAILED DESCRIPTION

Figure 1:
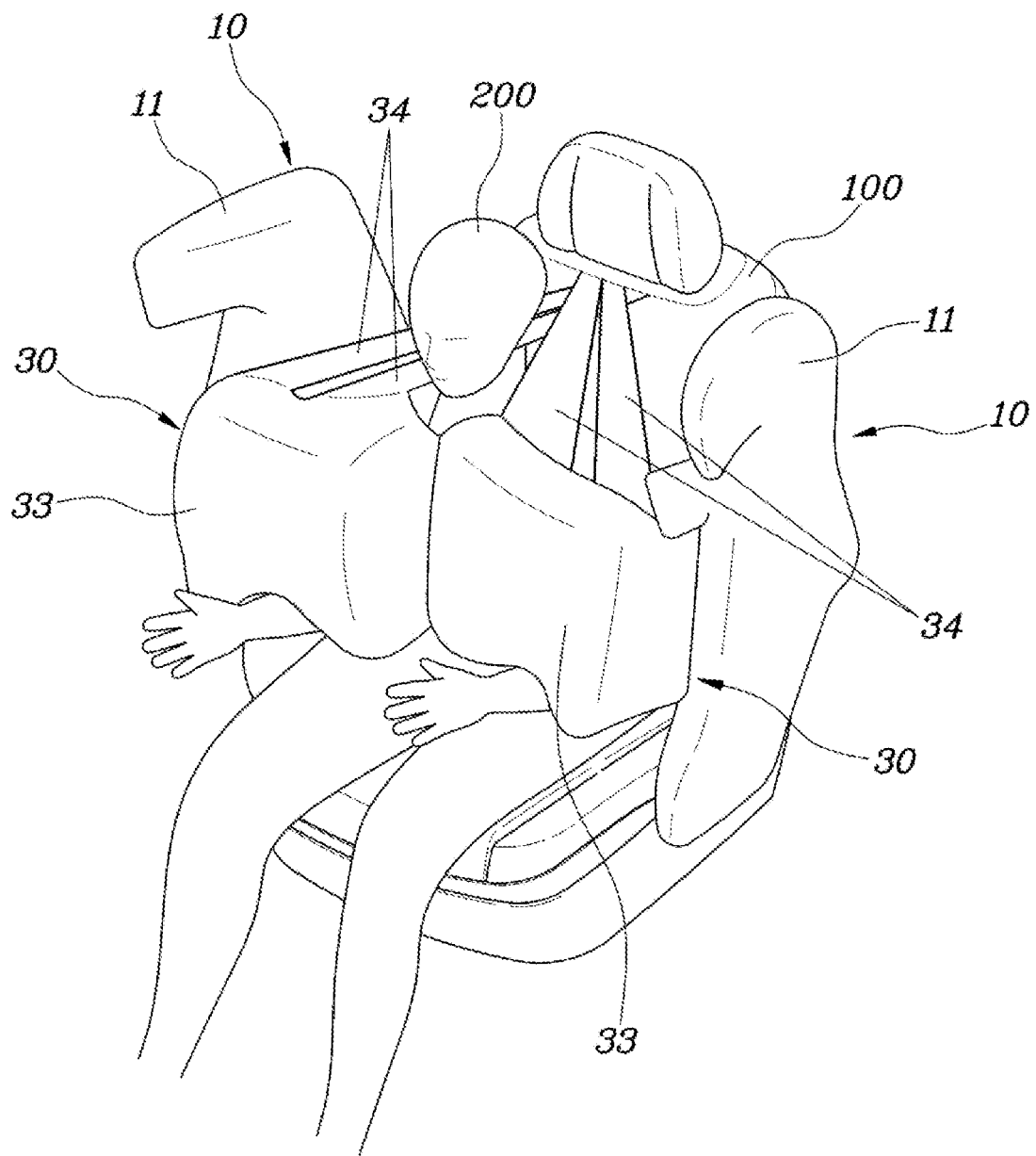
FIG. 1 is a perspective view of a seat airbag for a vehicle according to an embodiment of the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and "second" may be used herein only to describe various elements, but these elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

Figure 2:
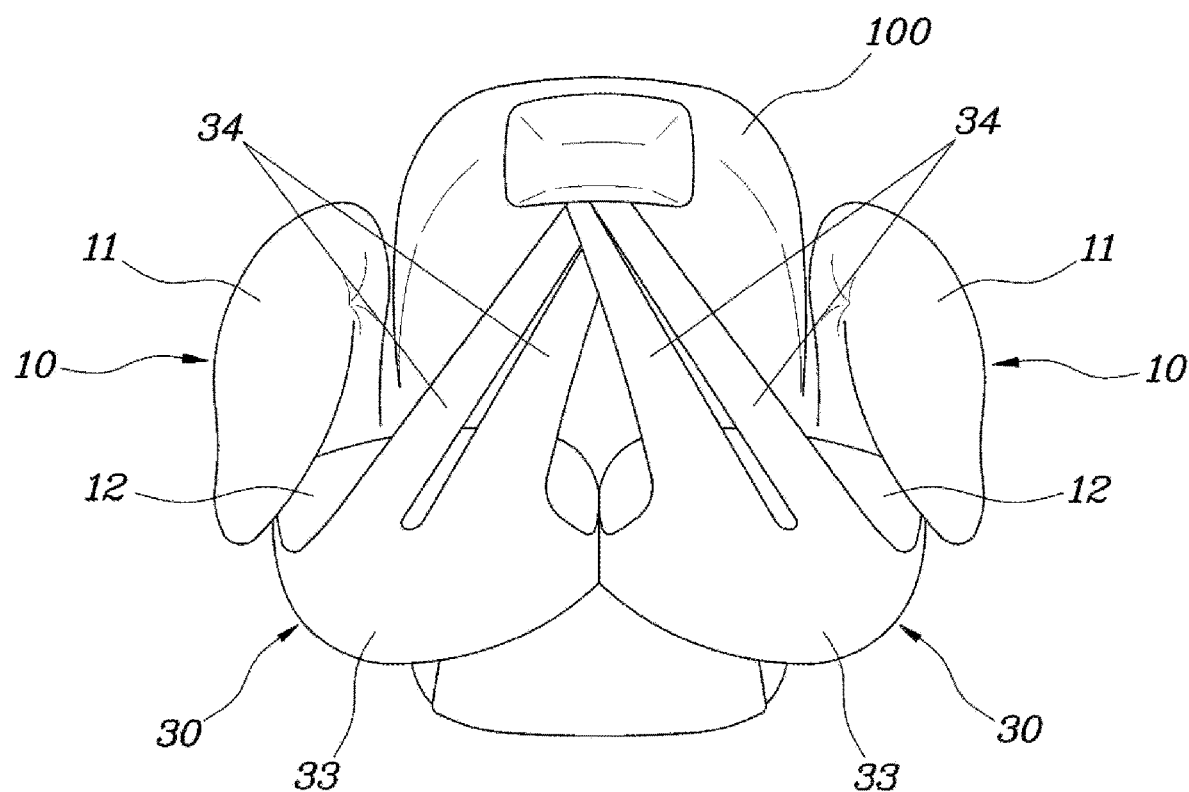
FIG. 2 is a top plan view illustrating a first embodiment of the seat airbag for a vehicle according to the embodiment of the present invention.
Figure 3:
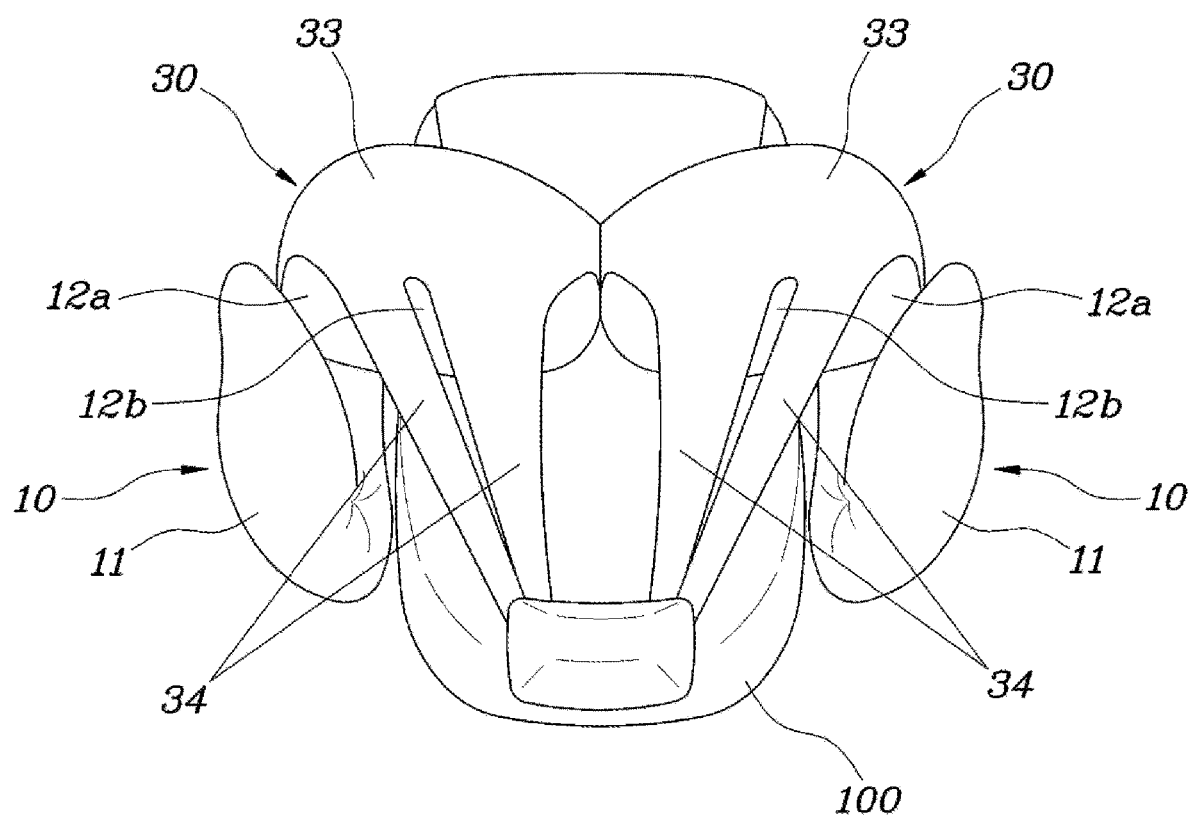
FIG. 3 is a top plan view illustrating a second embodiment of the seat airbag for a vehicle according to the embodiment of the present invention.
Figure 4:
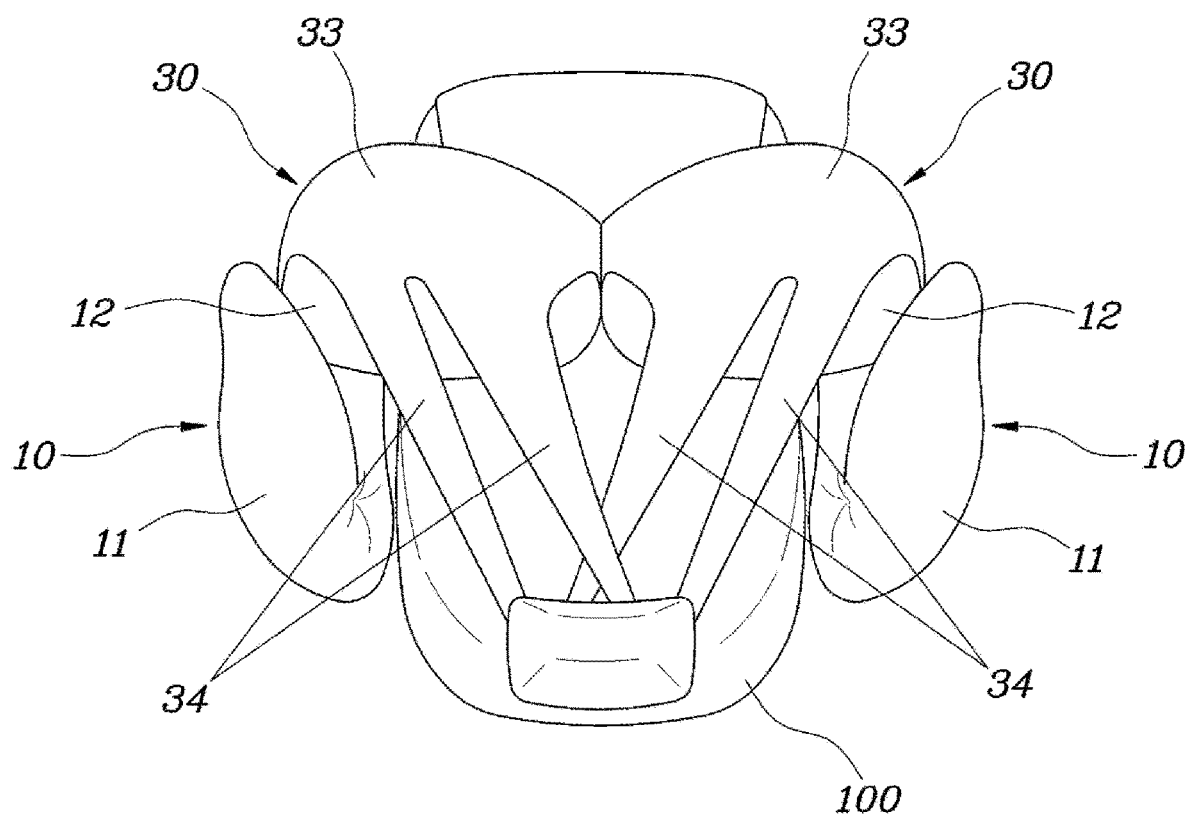
FIG. 4 is a top plan view illustrating a third embodiment of the seat airbag for a vehicle according to the embodiment of the present invention.
Figure 5:
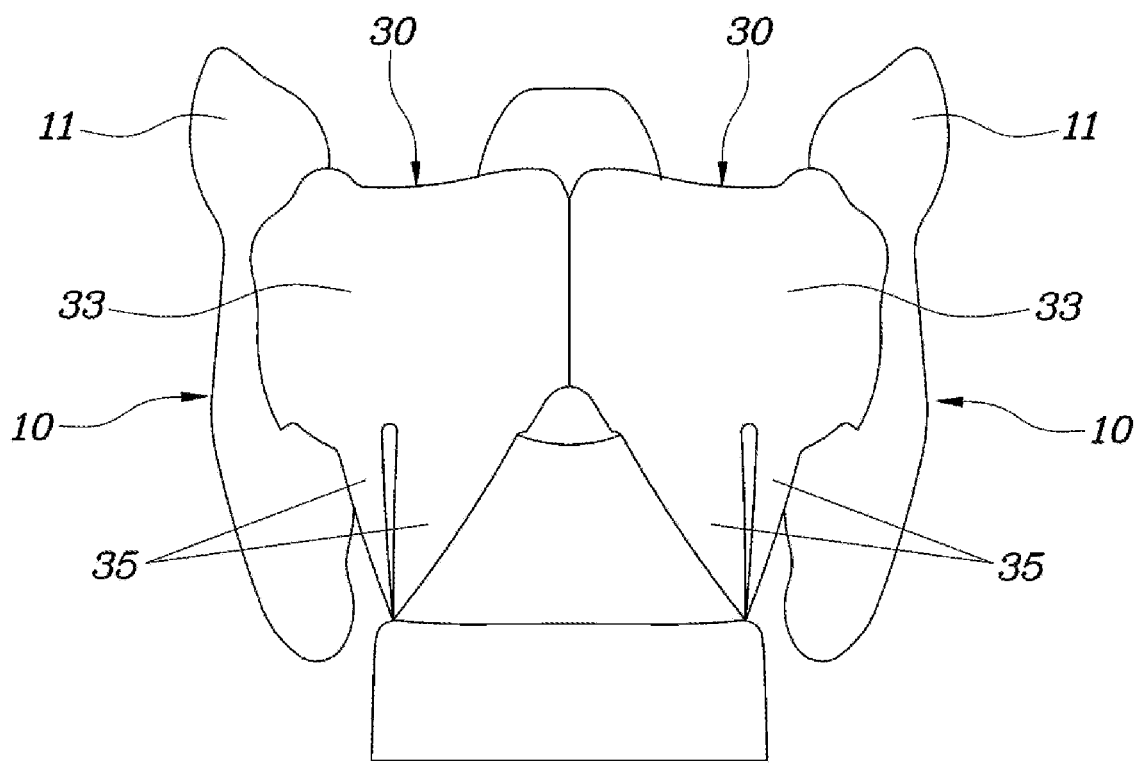
FIG. 5 is a view illustrating the seat airbag for a vehicle according to the embodiment of the present invention when viewed from the lower side.
Figure 6:
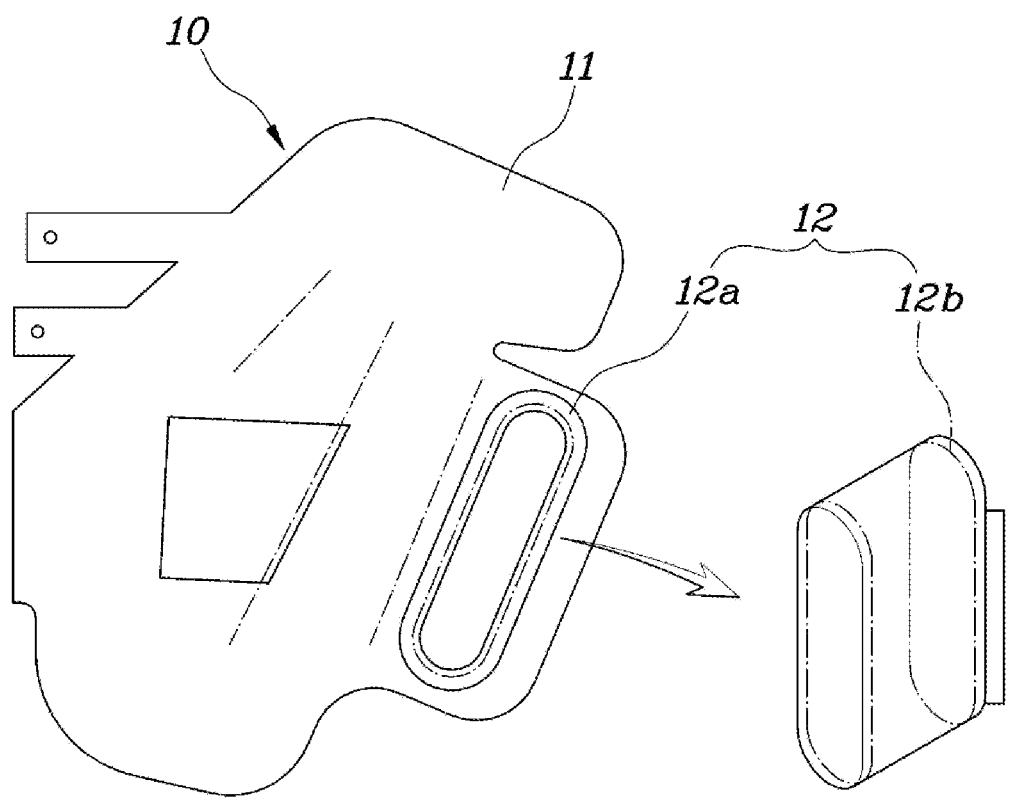
FIG. 6 is a view illustrating an airbag cushion of the seat airbag for a vehicle according to the embodiment of the present invention.
Figure 7:
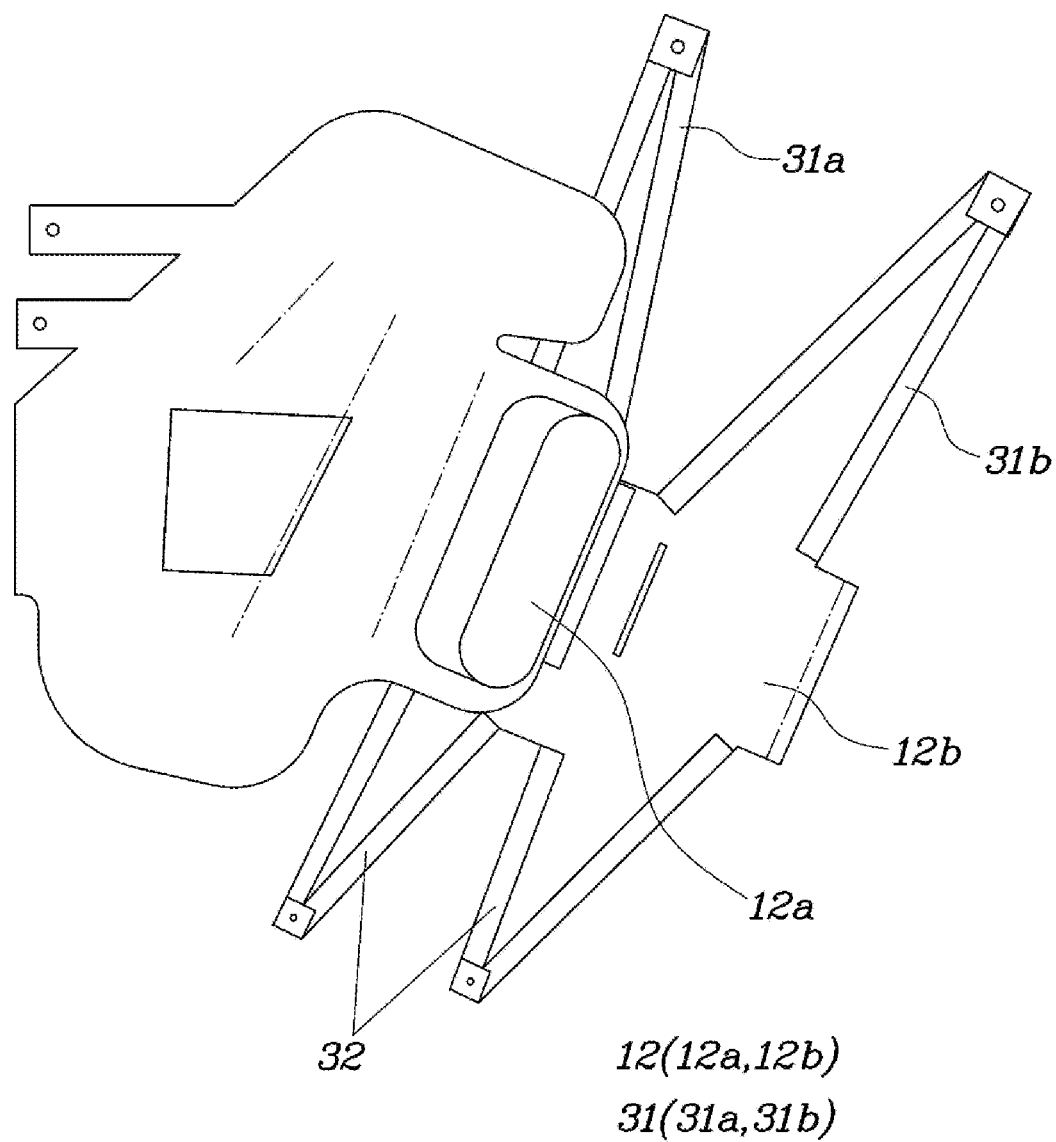
FIG. 7 is a view illustrating a state in which a support tether is coupled to the airbag cushion of the seat airbag for a vehicle according to the embodiment of the present invention.

FIG. 1 is a perspective view of a seat airbag for a vehicle according to an embodiment of the present invention, FIG. 2 is a top plan view illustrating a first embodiment of the seat airbag for a vehicle according to the embodiment of the present invention, FIG. 3 is a top plan view illustrating a second embodiment of the seat airbag for a vehicle according to the embodiment of the present invention, FIG. 4 is a top plan view illustrating a third embodiment of the seat airbag for a vehicle according to the embodiment of the present invention, FIG. 5 is a view illustrating the seat airbag for a vehicle according to the embodiment of the present invention when viewed from the lower side, FIG. 6 is a view illustrating an airbag cushion of the seat airbag for a vehicle according to the embodiment of the present invention, and FIG. 7 is a view illustrating a state in which a support tether 30 is coupled to the airbag cushion of the seat airbag for a vehicle according to the embodiment of the present invention.

Exemplary embodiments of a seat airbag for a vehicle according to the present invention will be described with reference to FIGS. 1 to 7.

The seat airbag for a vehicle according to the present invention has been developed to protect a driver or passenger 200 (hereinafter "passenger 200") at any seating posture of the passenger 200 or any seat position among various shapes of seats being developed recently.

The seat airbag for a vehicle according to the present invention includes: an airbag cushion 10 including lateral cushions 11 configured to be deployed forward from lateral sides of a seatback 100, and front cushions 12 bent and extending from front ends of the lateral cushions 11 toward a seat center and positioned at a front side of the passenger 200; and support tethers 20 and 30 configured to connect upper portions of the front cushions 12 and an upper portion of the seatback 100 or connect lower portions of the front cushions 12 and a lower portion of the seatback 100 so that the front cushions 12 support the passenger 200 when the passenger 200 is loaded onto the front cushions 12.

The lateral cushions 11 may be deployed to protrude forward from the two opposite sides of the seat and protect lateral sides of the passenger 200. The front cushions 12 may be deployed to be bent and extend from the front ends of the lateral cushions 11 toward a central portion of the seat and be positioned at the front side of the passenger 200.

The lateral cushions 11 and the front cushions 12 may be symmetrically disposed at the two opposite sides of the seatback 100 and deployed to surround the two opposite sides and the front side of the passenger 200 in a state in which the passenger 200 is seated in the seat.

The support tether 30 may connect the upper portions of the front cushions 12 to the upper portion of the seatback 100 and connect the lower portions of the front cushions 12 to the lower portion of the seatback 100. Therefore, when the passenger 200 is loaded in a forward, transverse, or diagonal direction by an external collision of a vehicle, the support tether 30 supports the front cushions 12 to prevent the passenger 200 from separating from a portion between the front cushions 12.

In particular, the support tether 30, which connects the lower portion of the front cushion 12 and the lower portion of the seatback 100, may be connected to a lateral portion of the seat. Therefore, the lateral cushion 11 and the front cushion 12 may be deployed together while cutting a tear line formed on a lateral surface of the seatback 100.

In addition, the tear line extends to the upper portion of the seatback 100. Therefore, the support tether 30 connected to the upper portion of the seatback 100 may be deployed together with the lateral cushion 11 and the front cushion 12 while cutting the tear line.

Therefore, when the lateral cushion 11 and the front cushion 12 are deployed, the support tether 30 supports the front cushion 12, thereby supporting the load of the passenger 200 and protecting the front and lateral sides of the passenger 200 from an external collision.

The front cushion 12 includes a bent portion 12a bent from the front end of the lateral cushion 11, and an extension portion 12b extending from the bent portion 12a toward the center of the seat. The support tether 30 may include an upper tether 31 configured to connect the upper portion of the bent portion 12a and the upper portion of the extension portion 12b to the upper portion of the seatback 100, and a lower tether 32 configured to connect the lower portion of the bent portion 12a and the lower portion of the extension portion 12b to the lower portion of the seatback 100.

The bent portion 12a of the front cushion 12 may be bent toward the center of the seat from the front end of the lateral cushion 11 and define a deployment direction of the front cushion 12. The extension portion 12b may extend in a curved direction to the front side of the passenger 200.

Gas is injected into the lateral cushion 11 from an inflator mounted on the seatback 100. The bent portion 12a allows the lateral cushion 11 and the extension portion 12b to communicate with each other, such that the gas in the lateral cushion 11 may be injected into the extension portion 12b.

The upper tether 31 of the support tether 30 connects the upper portion of the bent portion 12a and the upper portion of the extension portion 12b to the upper portion of the seatback 100, and the lower tether 32 of the support tether 30 connects the bent portion 12a and the lower portion of the extension portion 12b to the lower portion of the seatback 100, such that the upper tether 31 and the lower tether 32 may support the extension portion 12b positioned at the front side of the passenger 200, support the bent portion 12a positioned at a diagonal side of the passenger 200, and support the lateral cushion 11.

Therefore, a support angle of the support tether 30 is improved so that the support tether 30 may support both the lateral cushion 11 and the front cushion 12, thereby preparing for collisions in various directions.

One end of the upper tether 31 is fixed to the seatback 100, and the other end of the upper tether 31 is divided and connected to the upper portion of the bent portion 12a and the upper portion of the extension portion 12b.

As illustrated in FIGS. 2 to 4, one end of the upper tether 31 connected to the upper portion of the front cushion 12 is connected, at one point, to the upper portion of the seatback 100, and the other end of the upper tether 31 is divided and connected to the upper portion of the bent portion 12a and the upper portion of the extension portion 12b.

Therefore, one surface of the upper tether 31 is cut out, such that the upper tether 31 may connect the bent portion 12a and the extension portion 12b. A part of the upper tether 31, which is bent when the bent portion 12a is inflated, may be removed, thereby increasing an angle at which the upper tether 31 may support the front cushion 12.

In addition, the upper tether 31 is manufactured as a single surface tether, which makes it possible to reduce manufacturing costs.

The lateral cushion 11, the front cushion 12, and the support tether 30 are respectively provided as a pair of lateral cushions 11, a pair of front cushions 12, and a pair of support tethers 30, which are symmetrically disposed at the two opposite sides of the seatback 100. One end of the upper tether 31 may be connected to positions on the seatback 100, which are spaced apart from each other in a leftward/rightward direction of the vehicle.

As illustrated in FIG. 3, the portions of one end of the upper tether 31 may be connected to the upper portion of the seatback 100, spaced apart from each other in the leftward/rightward direction of the vehicle, and connected to the upper side of the seatback 100.

Therefore, because the tear line may be formed on the seatback 100 only to the upper side of the seatback 100, the cut-out portion of the seatback 100 may be reduced, such that the upper tether 31 may be quickly deployed.

The pair of lateral cushions 11, the pair of front cushions 12, and the pair of support tethers 30 are respectively disposed at the two opposite sides of the seatback 100, and the upper tethers 31 may intersect each other at one end thereof and be connected to the seatback 100.

As illustrated in FIG. 2, the upper tethers 31 may intersect each other at one end thereof and be connected to the upper portion of the seatback 100.

Therefore, a length of the upper tether 31 may increase, and an angle between the seatback 100 and the support tether 30 may decrease, thereby supporting the supporting force of the front cushion 12 and the lateral cushion 11.

The upper tether 31 may be provided in plural and include: a first tether 31a having one end fixed to the seatback 100 and the other end connected to the upper portion of the bent portion 12a; and a second tether 31b having one end fixed to the seatback 100 and the other end connected to the upper portion of the extension portion 12b.

As illustrated in FIG. 7, the first tether 31a may be connected to the upper portion of the bent portion 12a, and the second tether 31b may be connected to the upper portion of the extension portion 12b, thereby supporting the upper portion of the bent portion 12a and the upper portion of the extension portion 12b.

Therefore, since the first tether 31a and the second tether 31b independently support the extension portion 12b and the bent portion 12a, respectively, the first tether 31a and the second tether 31b may also support the front cushion 12 and the lateral cushion.

The pair of lateral cushions 11, the pair of front cushions 12, and the pair of support tethers 30 are symmetrically disposed at the two opposite sides of the seatback 100. The pair of first tethers 31a may be connected to the seatback 100 so that the pair of first tethers 31a intersect each other at one end thereof. The pair of second tethers 31b may be spaced apart from each other in the leftward/rightward direction of the vehicle and connected to the seatback 100.

As illustrated in FIG. 4, the pair of first tethers 31a may intersect each other at one end thereof and be connected to the upper portion of the seatback 100. The pair of second tethers 31b may be spaced apart from each other in the leftward/rightward direction of the vehicle and connected to the seatback.

Therefore, the first tethers 31a support the front cushions 12 so that the front cushions 12 are not spaced apart from each other, thereby preventing the passenger 200 from slipping out between the front cushions 12. The second tethers 31*b* may be connected to the bent portions 12*a*, thereby supporting the loads of the passenger 200 in the forward and diagonal directions.

One end of the lower tether 32 may be connected to a lateral lower portion of the seatback 100, and the other end of the lower tether 32 may be divided and connected to the lower portion of the bent portion 12*a* and the lower portion of the extension portion 12*b*.

Since one end of the lower tether 32 is connected to the seatback 100, and the other end of the lower tether 32 is divided and connected to the lower portion of the bent portion 12*a* and the lower portion of the extension portion 12*b*, the lower tether 32 may be disposed so as not to hinder the inflation between the bent portion 12*a* and the extension portion 12*b*.

Figure 8:
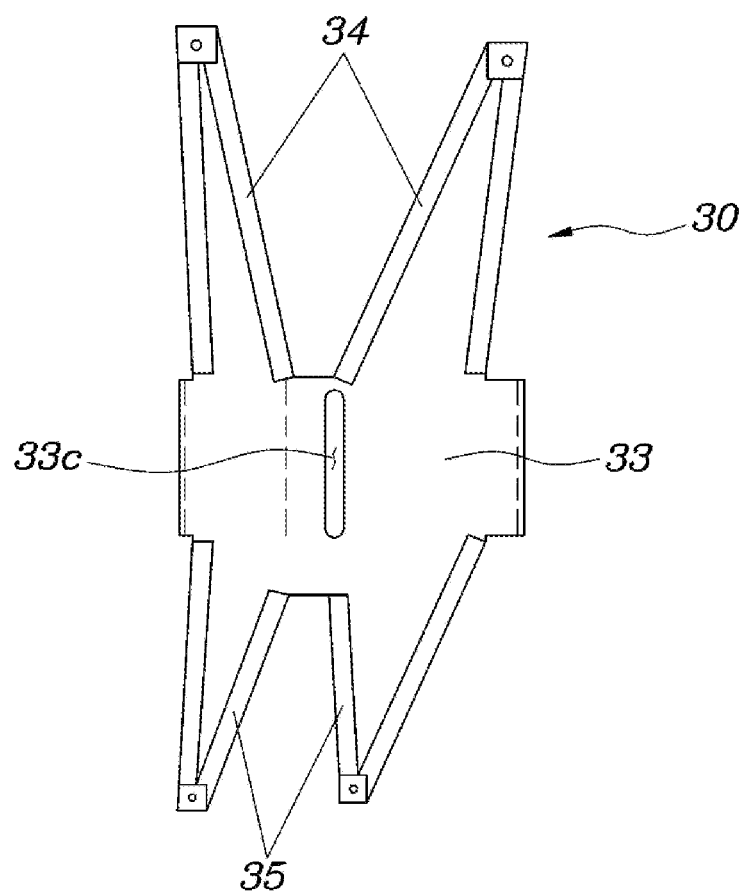
FIGS. 8 to 10 are views illustrating various examples of the support tether included in the seat airbag for a vehicle according to the embodiment of the present invention.
Figure 9:
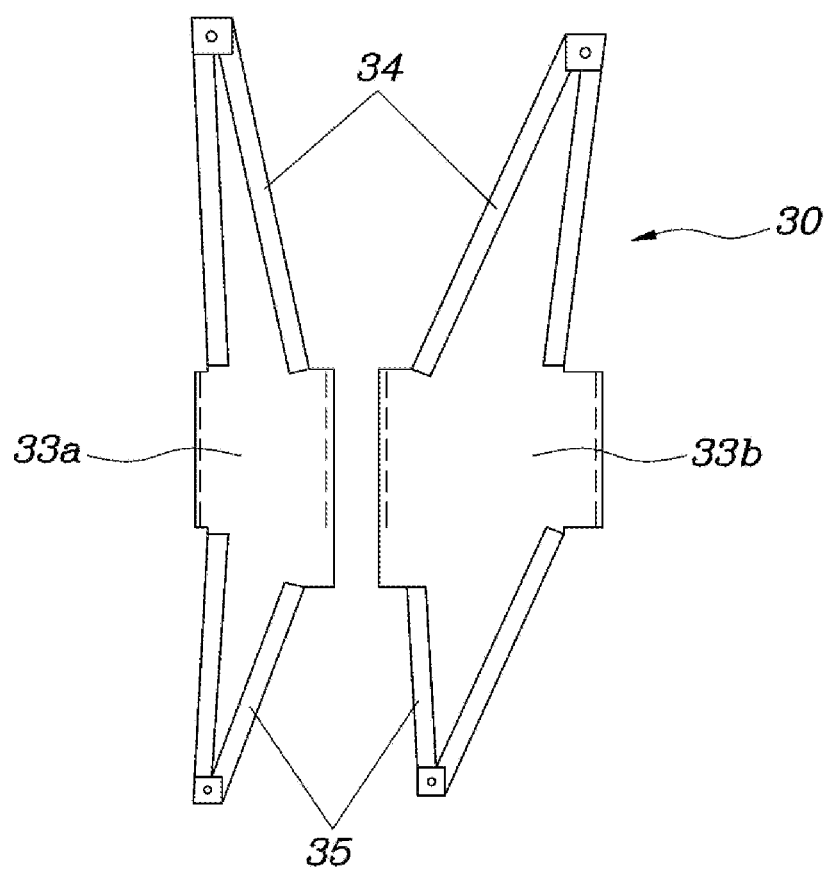
Figure 10:
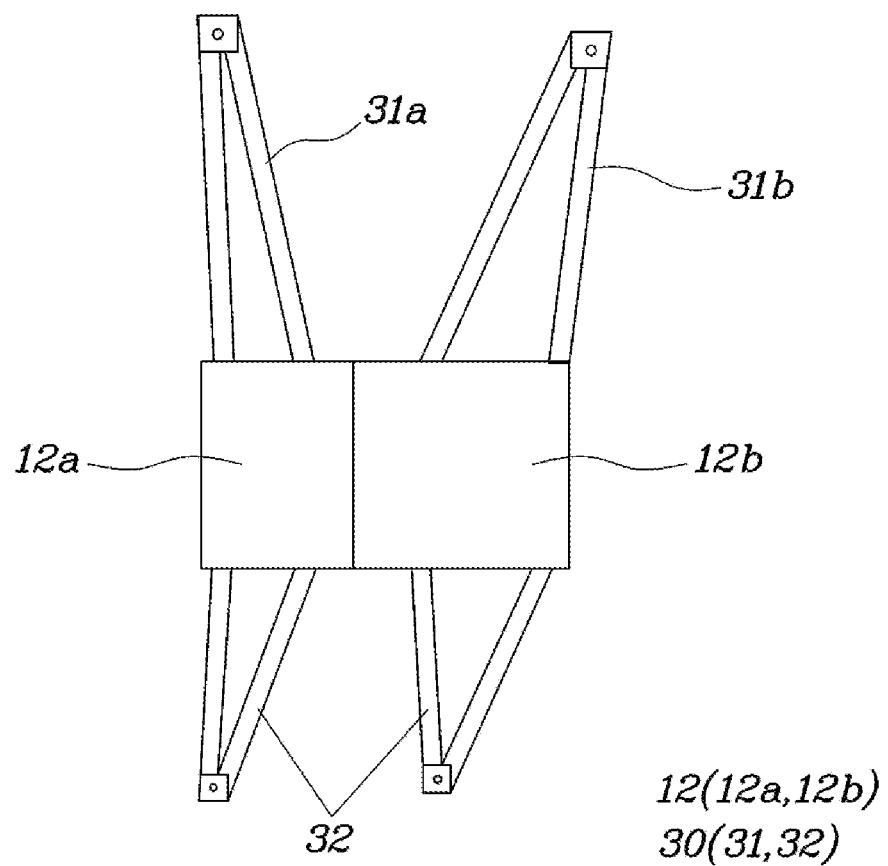

FIGS. 8 to 10 are views illustrating various examples of the support tether 30 included in the seat airbag for a vehicle according to the embodiment of the present invention.

FIG. 8 is a view illustrating an example in which upper support portions 34 and lower support portions 35 are formed on a cover portion (or cover) 33 and separated from one another, FIG. 9 is a view illustrating an example in which cover portions 33 are separated from each other, and upper support portions 34 and lower support portions 35 are respectively formed on the cover portions 33, and FIG. 10 is a view illustrating an example in which upper tethers 31 and lower tethers 32 are respectively connected to front cushions 12.

The support tether 30 may include a cover portion 33 configured to surround an outer side of the front cushion 12, an upper support portion 34 extending from an upper portion of the cover portion 33 and connected to the upper portion of the seatback 100, and a lower support portion 35 extending from a lower portion of the cover portion 33 and connected to the lower portion of the seatback 100. The cover portion 33 may be connected to the front cushion 12 by sewing.

As illustrated in FIGS. 1, and 8 to 9, one end of the support tether 30 may be connected to the upper portion of the seatback 100, the other end of the support tether 30 may be connected to the lower portion of the seatback 100, the cover portion 33 disposed at the intermediate side may surround the front cushion 12, and the cover portion 33 may extend upward and downward and be connected to the seatback 100.

In addition, a plurality of portions of the cover portion 33 is coupled to the front cushion 12 by sewing, which makes it possible to prevent the front cushion 12 from separating from the cover portion 33.

Therefore, the cover portion 33 may securely support the seatback 100, the front cushion 12, and the lateral cushion 11 while supporting the entire front cushion 12.

The cover portion 33 may include a slit 33*c* formed in a portion where the front cushion 12 is bent, and the slit 33*c* extends in the upward/downward direction.

Since the slit 33*c* extending upward is formed in the portion of the cover portion 33 where the front cushion 12 is bent, the front cushion 12 may be positioned at the front side of the passenger 200 while being assuredly bent toward the passenger 200 through a vacant space of the slit 33*c*, such that the support tether 30 may assuredly support the front cushion 12.

The cushion includes the bent portion 12*a* bent from the front end of the lateral cushion 11, and the extension portion 12*b* extending from the bent portion 12*a* toward the center of the seat. The upper support portion 34 may be provided in plural, and the plurality of upper support portions 34 may respectively extend from the upper portion of the bent portion 12*a* and the upper portion of the extension portion 12*b* and be connected to the upper portion of the seatback 100. The lower support portion 35 may be provided in plural, and the plurality of lower support portions 35 may respectively extend from the lower portion of the bent portion 12*a* and the lower portion of the extension portion 12*b* and be connected to the lower portion of the seatback 100.

The cover portion 33 may surround both the bent portion 12*a* and the extension portion 12*b*. The upper support portions 34, which extend from the upper portion of the cover portion 33 and are connected to the upper portion of the seatback 100, may be separated from each other at the upper portion of the bent portion 12*a* and the upper portion of the extension portion 12*b* and connected to the upper portion of the seatback 100.

In addition, the lower support portions 35 are separated from each other at the lower portion of the bent portion 12*a* and the lower portion of the extension portion 12*b* and connected to the lower portion of the seatback 100.

Therefore, it is possible to support both the bent portion 12*a* and the extension portion 12*b* and increase the force for restraining the passenger 200 so that the passenger 200 does not slip out forward between the extension portions 12*b*.

The cushion includes the bent portion 12*a* bent from the front end of the lateral cushion 11, and the extension portion 12*b* extending from the bent portion 12*a* toward the center of the seat. The cover portions 33 include a lateral portion 33*a* configured to cover the bent portion 12*a*, and a front portion 33*b* configured to cover the extension portion 12*b*. The upper support portion 34 and the lower support portion 35 may respectively extend upward and downward from the lateral portion 33*a* and the front portion 33*b*.

As illustrated in FIG. 9, the cover portions 33 are separated from each other and respectively cover the bent portion 12*a* and the extension portion 12*b*. The upper support portions 34 and the lower support portions 35 may respectively extend from the upper and lower portions of the cover portions 33 and be respectively connected to and supported by the upper and lower portions of the seatback 100. The plurality of cover portions 33 may be respectively coupled to the corresponding bent portion 12*a* and the corresponding extension portion 12*b* by sewing, thereby preventing the separation of the bent portion 12*a* and the extension portion 12*b*.

Therefore, the tethers are connected directly to the extension portion 12*b* and the bent portion 12*a*, which makes it possible to increase the force for restraining the passenger 200.

The various examples related to the connection between the upper tether 31 and the seat may be applied to the embodiment in which the upper support portion 34 is connected to the upper portion of the seatback 100.

The support tether 30 may be formed in a surface shape and coupled to the front cushion 12 by sewing.

As illustrated in FIG. 10, the support tether 30 is formed as a surface tether having a surface shape and coupled to the seatback 100 in a point coupling manner. The front cushion 12 is coupled by being sewn with line contact, such that a support portion increases in a direction in which the front cushion 12 extends. Therefore, it is possible to improve the supporting force of the support cushion.

Figure 11:
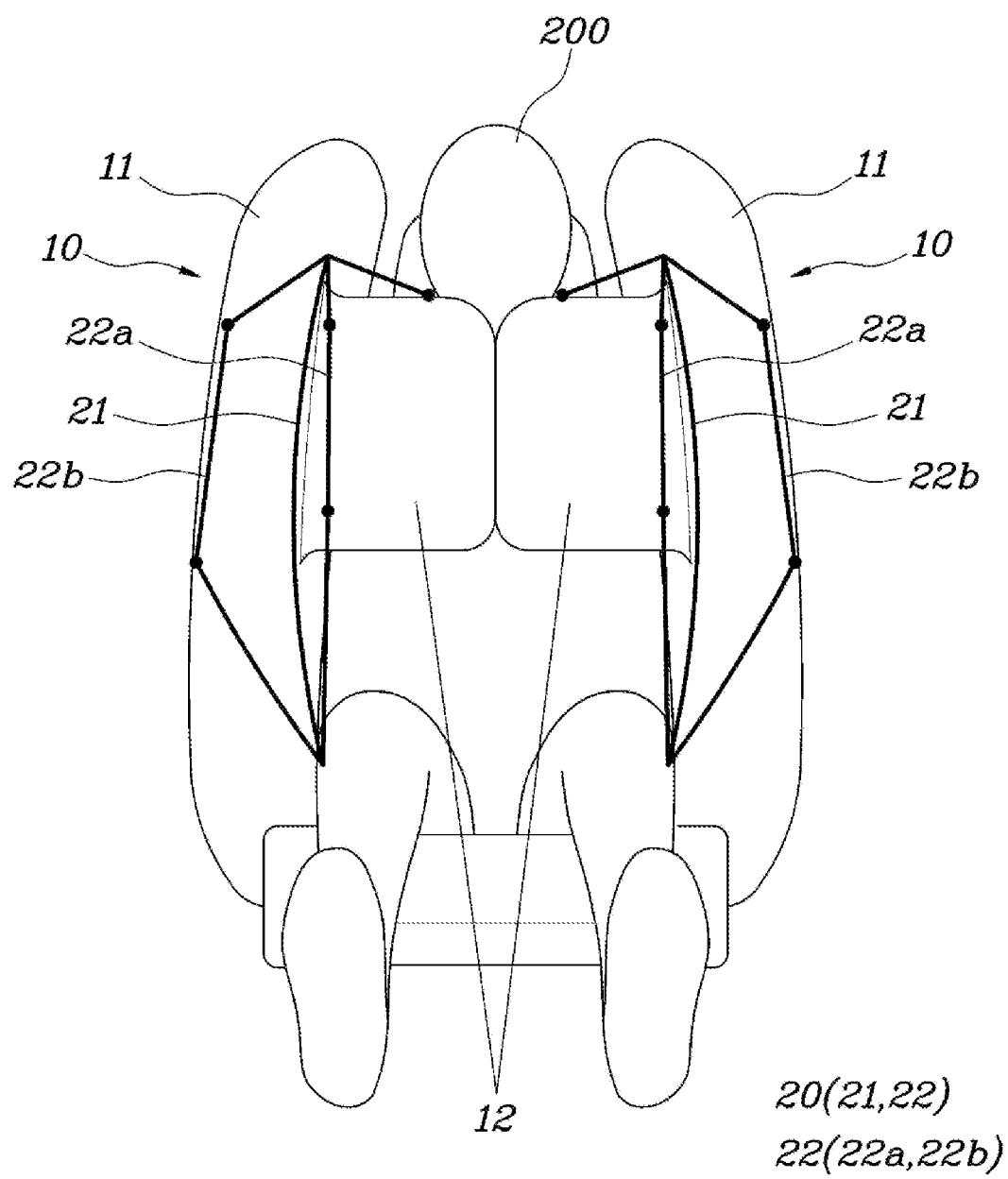
FIG. 11 is a perspective view of a seat airbag for a vehicle according to another embodiment of the present invention.
Figure 12:
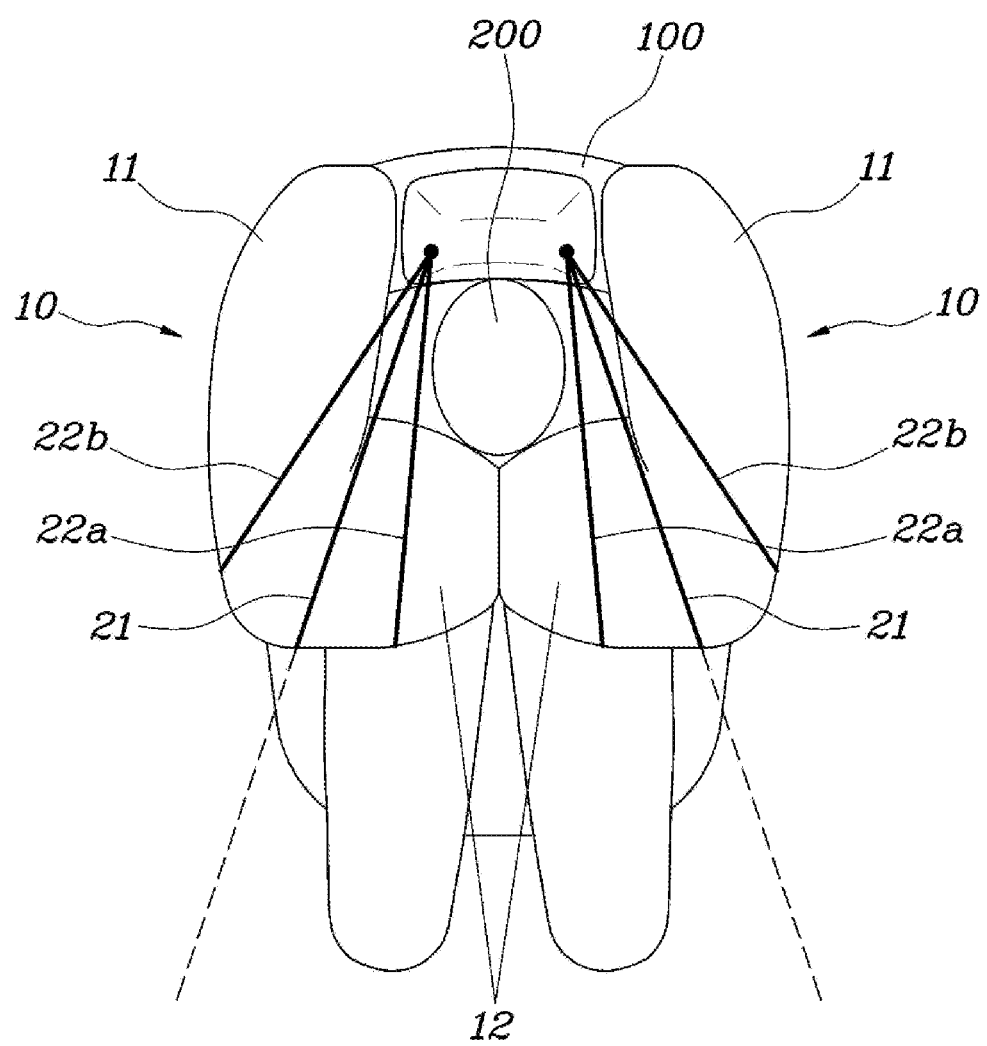
FIG. 12 is a top plan view of the seat airbag for a vehicle according to another embodiment of the present invention.
Figure 13:
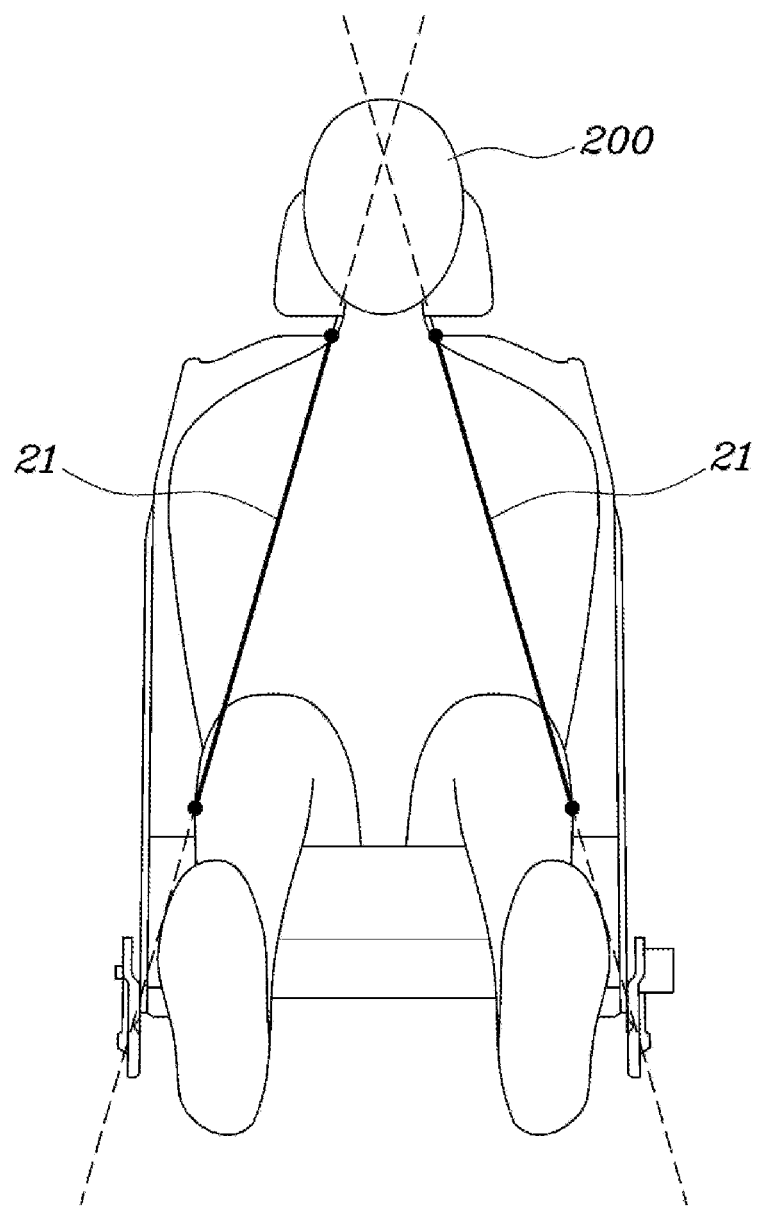
FIG. 13 is a view illustrating a fixing point of a main tether of the seat airbag for a vehicle according to another embodiment of the present invention.
Figure 14:
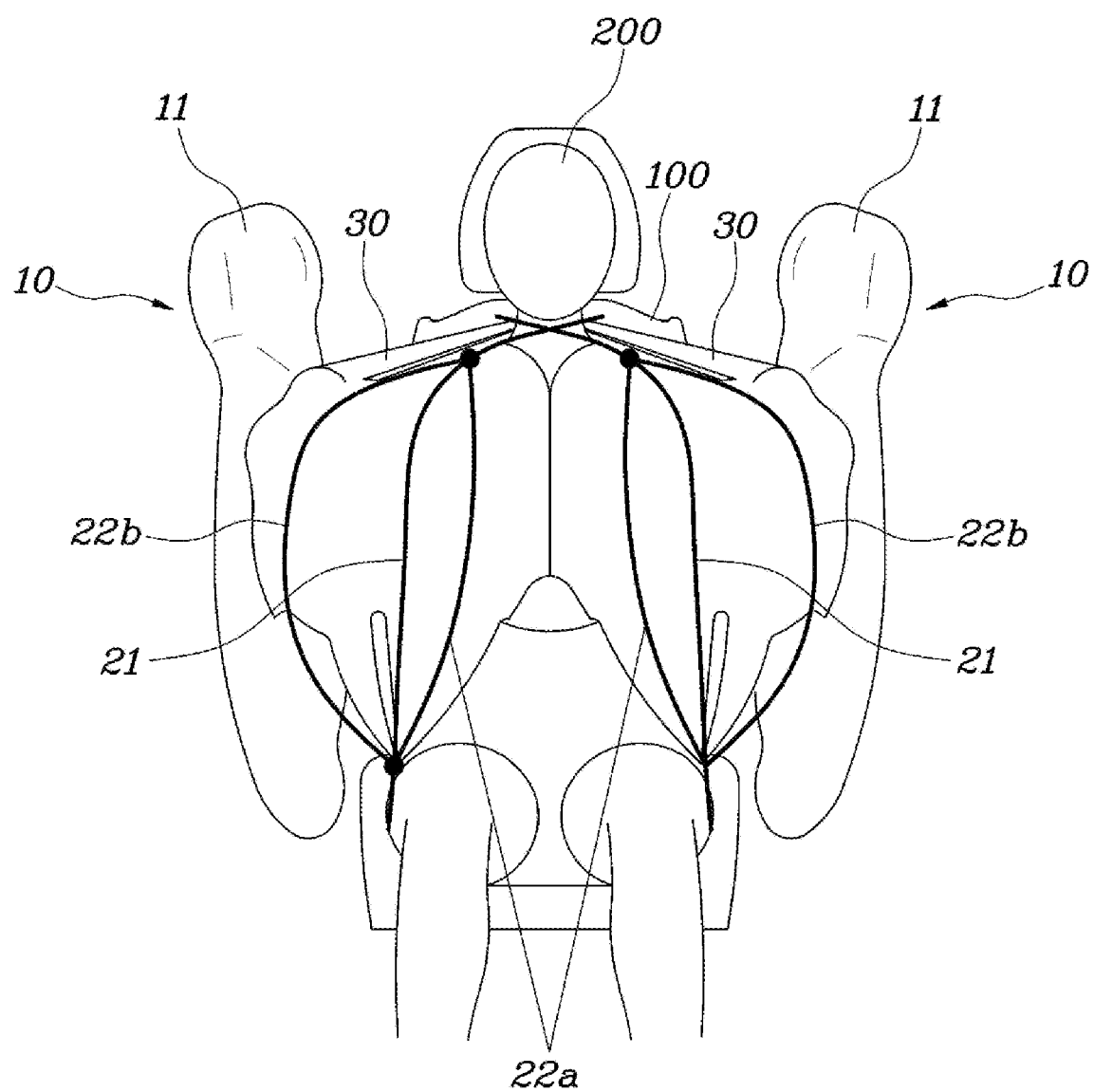
FIG. 14 is a perspective view of the seat airbag for a vehicle according to another embodiment of the present invention.
Figure 15:
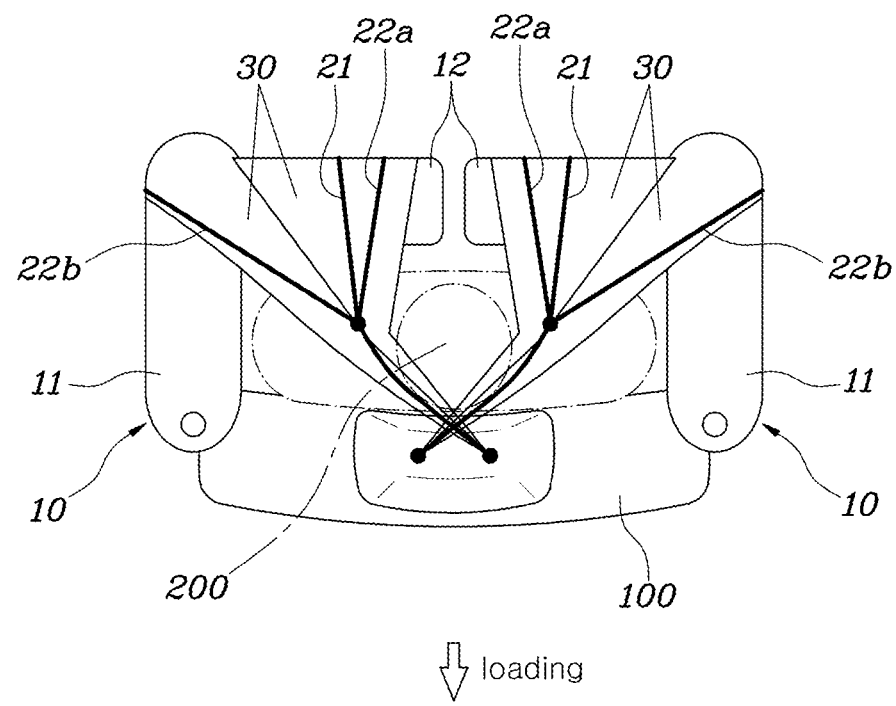
FIG. 15 is a top plan view illustrating a situation in which a passenger is loaded onto the seat airbag for a vehicle according to another embodiment of the present invention.
Figure 15:
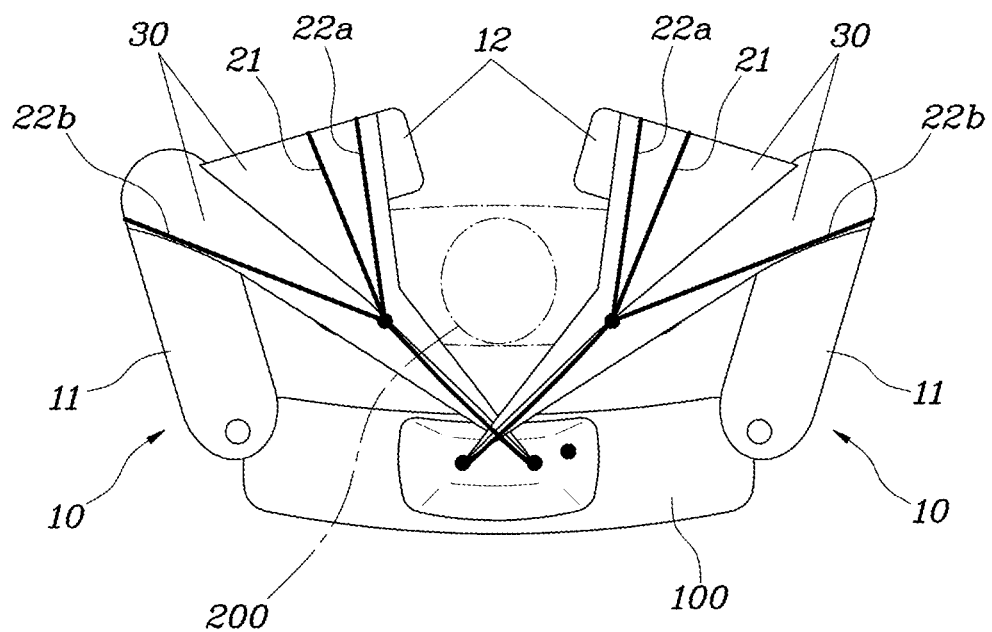

FIG. 11 is a perspective view of a seat airbag for a vehicle according to another embodiment of the present invention, FIG. 12 is a top plan view of the seat airbag for a vehicle according to another embodiment of the present invention, FIG. 13 is a view illustrating a fixing point of a main tether 21 of the seat airbag for a vehicle according to another embodiment of the present invention, and FIG. 14 is a perspective view of the seat airbag for a vehicle according to another embodiment of the present invention.

Another embodiment of the seat airbag for a vehicle according to the present invention will be described with reference to FIGS. 11 to 14.

The seat airbag for a vehicle according to the present invention has been developed to protect the passenger 200 at any seating posture of the passenger 200 or any seat position among various shapes of seats being developed recently.

The airbag for a vehicle according to the present invention includes: an airbag cushion 10 including lateral cushions 11 configured to be deployed forward from lateral sides of a seatback 100, and front cushions 12 bent and extending from front ends of the lateral cushions 11 toward a seat center and positioned at a front side of the passenger 200; and a plurality of linear support tethers 20 configured to connect an upper portion of the airbag cushion 10 and an upper portion of the seatback 100 or connect a lower portion of the airbag cushion 10 and a lower portion of the seatback 100 so that the airbag cushion 10 supports the passenger 200 when the passenger 200 is loaded onto the airbag cushion 10. The plurality of support tethers 20 may extend toward the airbag cushion 10 at different angles.

The lateral cushions 11 may be deployed to protrude forward from the two opposite sides of the seat and protect lateral sides of the passenger 200. The front cushions 12 may be deployed to be bent and extend from the front ends of the lateral cushions 11 toward a central portion of the seat, and the front cushions 12 may be positioned at the front side of the passenger 200.

The lateral cushions 11 and the front cushions 12 may be symmetrically disposed at the two opposite sides of the seat and deployed to surround the two opposite sides and the front side of the passenger 200 in a state in which the passenger 200 is seated in the seat.

One end of the linear support tether 20 may be connected to the upper portion of the seatback 100, and the other end of the linear support tether 20 may be connected to the airbag cushion 10 at the intermediate side of the seatback 100.

In addition, the support tethers 20 having a line shape are connected to the airbag cushion 10 and support the motion of the airbag cushion 10 when the passenger 200 is loaded onto the airbag cushion 10. The support tether 20 having a line shape may be easily embedded or mounted in the seatback 100 and quickly deployed together with the airbag cushion 10 when the airbag cushion 10 is deployed.

In addition, the costs required to manufacture the linear tether may be reduced compared to the surface tether.

The support tether 20 may be provided in plural, and the plurality of support tethers 20 is connected to the airbag cushion 10 at different positions. Therefore, the plurality of support tethers 20 may be connected to the seatback at different angles.

Since the plurality of support tethers 20 is connected to the airbag cushion 10 at various angles, it is possible to support the passenger 200 even though the passenger 200 is loaded in a forward, transverse, or diagonal direction when the passenger 200 is loaded onto the airbag cushion 10.

The support tethers 20 may include: main tethers 21 each having one end connected to the upper portion of the seatback 100 and the other end connected to the lower portion of the seatback 100, the main tether 21 being connected to the airbag cushion 10 on an extension line of an imaginary line connecting connection points on the upper and lower portions of the seatback 100; and auxiliary tethers 22 disposed inside or outside the main tether 21 and connected to the airbag cushion 10.

The support tether 20 is provided in plural and disposed on the airbag cushion 10. The main tether 21 may be connected to the front cushion 12 of the airbag cushion 10 and positioned on the imaginary line extending toward the front side of the seatback 100 from the connection line that connects the connection point connected to the upper end of the seatback 100 and the connection point connected to the lower end of the seatback 100. The auxiliary tether 22 may be positioned outside or inside the main tether 21, positioned at different angles with respect to the main tether 21, and connected to the lateral cushion 11 or the front cushion 12 of the airbag cushion 10.

Therefore, the main tethers 21 may support the entire airbag cushion 10. The auxiliary tethers 22 may prevent the passenger 200 from separating from the airbag cushion 10 when the passenger 200 is loaded in a direction in which the main tethers 21 cannot support the airbag cushion 10.

The auxiliary tether 22 may be provided in plural, and the plurality of auxiliary tethers may be connected to the front cushion 12 or the lateral cushion 11 of the airbag cushion 10.

The auxiliary tether 22 positioned outside the main tether 21 may be connected to a point at which the front cushion 12 and the lateral cushion 11 are connected. The auxiliary tether 22 positioned inside the main tether 21 may be connected to the intermediate side of the front cushion 12.

The auxiliary tether 22 connected to the front cushion 12 may support the passenger 200 loaded forward, and the auxiliary tether 22 connected to the lateral cushion 11 may support the passenger 200 loaded diagonally or loaded laterally.

One or more auxiliary tethers 22 may branch off from the main tether 21 and be connected to the front cushion 12 or the lateral cushion 11 of the airbag cushion 10, and the ends of the auxiliary tethers 22 may be connected to the main tether 21 again.

The auxiliary tethers 22 may branch off from the main tether 21 and extend in different directions from the main tether 21, and the auxiliary tethers 22 extending in the different directions may be connected to the front cushion 12 or the lateral cushion 11 of the airbag cushion 10.

Therefore, only the main tether 21 may be connected to the seatback 100, and the main tether 21 and the auxiliary tether 22 may be connected to the airbag cushion 10, which makes it possible to simplify the connection between the support tether 20 and the airbag cushion 10.

One or more auxiliary tethers 22 may branch off at the side adjacent to the head of the passenger 200 and be connected to the airbag cushion 10.

The auxiliary tethers 22 may branch off from the main tether 21 at the side adjacent to the head of the passenger 200 and be connected to the front cushion 12 or the lateral cushion 11 of the airbag cushion 10.

Therefore, the auxiliary tethers 22 may branch off at an optimal position at which the auxiliary tethers 22 may support the airbag cushion 10, thereby supporting the front cushion 12 and the lateral cushion 11 of the airbag cushion 10.

The auxiliary tethers 22 may include a first tether 22a disposed inside the main tether 21 and connected to the front cushion 12 of the airbag cushion 10, and a second tether 22b disposed outside the main tether 21 and connected to the lateral cushion 11 of the airbag cushion 10. Therefore, the auxiliary tethers 22 may support the load of the passenger 200 in the forward, transverse, or diagonal direction.

The first tether 22a may be connected to the front cushion 12 and support the load of the passenger 200 toward the front cushion 12 of the airbag cushion 10. The second tether 22b may support a bent portion of the lateral cushion 11 or the front cushion 12, thereby preventing the portions of the airbag cushion 10 at the two opposite sides of the seat from separating from each other.

Figure 16:
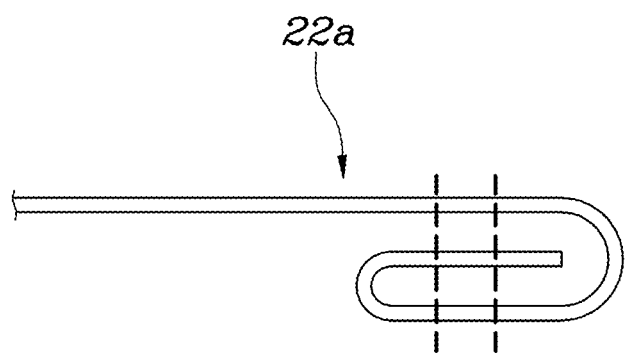
FIGS. 16 to 17 are cross-sectional views illustrating examples of a second tether.
Figure 17:
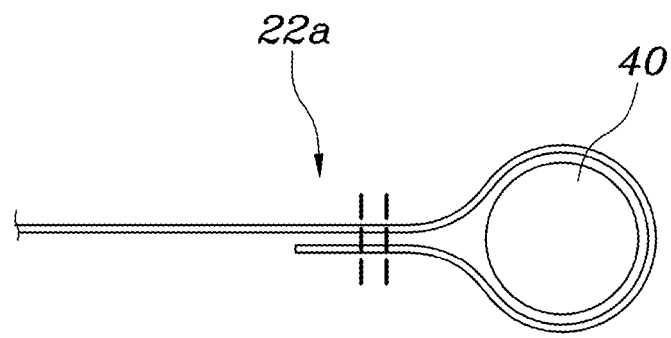

FIGS. 16 to 17 are cross-sectional views illustrating an embodiment of the second tether 22b.

Referring further to FIG. 16, in a first embodiment of the first tether 22a according to the present invention, an end of the first tether 22a, which is adjacent to the passenger 200 in the width direction, may be folded.

The first tether 22a may be positioned inside the main tether 21 and connected to the front cushion. In this case, when the passenger 200 is loaded in the transverse or diagonal direction, the passenger may come into contact with the first tether 22a, and the face or neck of the passenger 200 may be injured by being brought into contact with the first linear tether 22a by external impact.

To solve this problem, as illustrated in FIG. 16, an outer line disposed in a direction of the passenger 200, among outer lines of the first tether in a width direction, may be sewn in a superimposed state.

Therefore, the outer line of the first tether 22a adjacent to the passenger 200 may be smoothly formed. Therefore, the passenger 200 may not be injured by the first tether 22a even though the passenger 200 is brought into contact with the first tether 22a by external impact.

Referring further to FIG. 17, in a second embodiment of the first tether 22a according to the present invention, a reinforcing material 40 may be inserted into and positioned at an end of the first tether 22a based on width direction, which is adjacent to the passenger 200.

Likewise, as illustrated in FIG. 17, to prevent injury caused by contact between the passenger 200 and the first tether 22a, the reinforcing agent may be inserted into the first tether 22a or the first tether 22a may be sewn while surrounding a reinforcing agent extending in the longitudinal direction of the first tether 22a.

Therefore, the outer line of the first tether 22a adjacent to the passenger 200 may be smoothly formed. Therefore, the passenger 200 may not be injured by the first tether 22a even though the passenger 200 is brought into contact with the first tether 22a by external impact.

The support tether 20 may have a line shape and inserted into or connected to a ring provided on the airbag cushion 10 or connected to the airbag cushion 10 by sewing.

The support tether 20 may be configured as a linear tether. The linear support tether 20 may support the airbag cushion 10 by being connected to a ring provided on the front cushion 12 or the lateral cushion 11 of the airbag cushion 10. Alternatively, the support tether 20 may be connected directly to the airbag cushion 10 by sewing.

When the ring is used to connect the support tether 20, the packaging of the airbag cushion 10 may be more simplified. When the sewing is used to connect the support tether 20, it is possible to improve the supporting force of the airbag cushion 10.

The airbag may further include the support tether 30 having a surface shape and configured to connect the upper and lower portions of the front cushion 12 to the seatback 100 while surrounding the front cushion 120. The support tether 20 may be positioned outside the surface-shaped support tether 30 and connected to the airbag cushion 10 or the surface-shaped support tether 30.

The surface-shaped support tether 30 may be additionally provided to connect the upper portion of the front cushion 12 of the airbag cushion 10 to the upper portion of the seatback 100 and connect the lower portion of the front cushion 12 to the lower portion of the seatback 100. Therefore, the support tether 30 and the support tether 20 may simultaneously support the airbag cushion 10, thereby increasing the supporting force.

The airbag cushion 10 and the support tether 20 are respectively provided as a pair of airbag cushions 10 and a pair of support tethers 20 configured to be deployed symmetrically at the two opposite sides of the seat.

The airbag cushions 10 and the support tethers 20 are mounted at the two opposite sides of the seat and disposed symmetrically. In the event of a collision accident of a vehicle, the airbag cushions 10 and the support tethers 20 are quickly deployed while surrounding the two opposite sides and the front side of the passenger 200, thereby protecting the passenger 200 even though the collision of the vehicle occurs in any direction.

In addition, the support tethers 20 may support the airbag cushions 10 so that the airbag cushions 10 are not separated from each other. Therefore, the passenger 200 may be positioned in a space between the airbag cushion 10 and the seat.

The support tethers 20 may intersect each other at one end thereof and be connected to the upper portion of the seatback 100.

The support tethers 20 may be spaced apart from each other while intersecting each other and connected to the seatback 100 to reduce an angle at which the support tether 20 is connected to the airbag cushion 10.

Therefore, the supporting force of the support tether 20 may be increased so that the front cushions 12 of the airbag cushion 10 are not separated from each other.

While the specific embodiments of the present invention have been illustrated and described above, it will be obvious to those skilled in the art that the present invention may be variously modified and changed without departing from the technical spirit of the present invention defined in the appended claims.

What is claimed is:

1. A seat airbag for a vehicle having a seat and a seatback, the seat airbag comprising:
   (1) an airbag cushion comprising:
      first and second lateral cushions configured to deploy in a forward direction of the vehicle respectively from first and second lateral sides of the seatback; and
      first and second front cushions configured, when deployed, to extend from a front end portion of the first and second lateral cushions, respectively, toward a space above a center of the seat of the vehicle and be positioned in front of a driver or passenger seated on the seat; and
   (2) a plurality of support tethers configured to support the first and second front cushions when the driver or passenger is moved onto the first and second front cushions, the plurality of support tethers comprising:
      a first support tether extending from a plurality of upper portions of the first front cushion to a first upper portion of the seatback, or extending from a plurality of lower portions of the first front cushion to a first lower portion of the seatback; and
      a second support tether extending from a plurality of upper portions of the second front cushion to a second upper portion of the seatback, or extending from a plurality of lower portions of the second front cushion to a second lower portion of the seatback, wherein the first front cushion comprises:
- a bent portion coupled to the front end portion of the first lateral cushion; and
- an extension portion extending from the bent portion toward the space above the center of the seat, wherein the first support tether comprises:
- an upper tether extending from an upper portion of the bent portion and an upper portion of the extension portion of the first front cushion to the first upper portion of the seatback; and
- a lower tether extending from a lower portion of the bent portion and a lower portion of the extension portion of the first front cushion to the first lower portion of the seatback, and wherein the upper tether comprises:
- a first end portion coupled to the first upper portion of the seatback; and
- a pair of second end portions respectively coupled to the upper portion of the bent portion and the upper portion of the extension portion of the first front cushion.

2. The seat airbag of claim 1, wherein:
the first and second lateral cushions are symmetrically disposed respectively at the first and second lateral sides of the seatback,
the first and second front cushions are symmetrically disposed in front of the seatback,
the first and second support tethers are symmetrically disposed in front of the seatback, and
the first end portion of the upper tether includes a pair of first end portions respectively connected to a pair of upper portions of the seatback laterally spaced apart from each other.

3. The seat airbag of claim 1, wherein:
the first and second lateral cushions are symmetrically disposed respectively at the first and second lateral sides of the seatback,
the first and second front cushions are symmetrically disposed in front of the seatback, respectively,
the first and second support tethers are symmetrically disposed in front of the seatback,
the second support tether comprises an upper tether extending from the plurality of upper portions of the second front cushion to the second upper portion of the seatback, and
the upper tethers of the first and second support tethers intersect each other.

4. The seat airbag of claim 1, wherein the lower tether of the first support tether has a first end portion coupled to the first lower portion of the seatback and a second end portion divided into two portions that are respectively coupled to the lower portion of the bent portion and the lower portion of the extension portion of the first front cushion.

5. A seat airbag for a vehicle having a seat and a seatback, the seat airbag comprising:
(1) an airbag cushion comprising:
first and second lateral cushions configured to deploy in a forward direction of the vehicle respectively from first and second lateral sides of the seatback; and
first and second front cushions configured, when deployed, to extend from a front end portion of the first and second lateral cushions, respectively, toward a space above a center of the seat of the vehicle and be positioned in front of a driver or passenger seated on the seat; and
(2) a plurality of support tethers configured to support the first and second front cushions when the driver or passenger is moved onto the first and second front cushions, the plurality of support tethers comprising:
a first support tether extending from a plurality of upper portions of the first front cushion to a first upper portion of the seatback, or extending from a plurality of lower portions of the first front cushion to a first lower portion of the seatback; and
a second support tether extending from a plurality of upper portions of the second front cushion to a second upper portion of the seatback, or extending from a plurality of lower portions of the second front cushion to a second lower portion of the seatback, wherein the first front cushion comprises:
- a bent portion coupled to the front end portion of the first lateral cushion; and
- an extension portion extending from the bent portion toward the space above the center of the seat, and wherein the first support tether comprises:
- an upper tether extending from an upper portion of the bent portion and an upper portion of the extension portion of the first front cushion to the first upper portion of the seatback; and
- a lower tether extending from a lower portion of the bent portion and a lower portion of the extension portion of the first front cushion to the first lower portion of the seatback, wherein the upper tether of the first support tether comprises a plurality of upper tethers including:
- a first tether having a first end portion coupled to the seatback and a second end portion coupled to the upper portion of the bent portion; and
- a second tether having a first end portion coupled to the seatback and a second end portion coupled to the upper portion of the extension portion.

6. The seat airbag of claim 5, wherein:
the first and second lateral cushions are symmetrically disposed respectively at the first and second lateral sides of the seatback,
the first and second front cushions are symmetrically disposed in front of the seatback,
the first and second support tethers are symmetrically disposed in front of the seatback,
the second front cushion comprises:
a bent portion coupled to the front end portion of the second lateral cushion; and
an extension portion extending from the bent portion of the second front cushion toward the space above the center of the seat,
the second support tether comprises:
an upper tether extending from an upper portion of the bent portion and an upper portion of the extension portion of the second front cushion to the second upper portion of the seatback; and
a lower tether extending from a lower portion of the bent portion and a lower portion of the extension portion of the second front cushion to the second lower portion of the seatback,
the upper tether of the second support tether comprises a plurality of upper tethers including:
a first tether having a first end portion coupled to the seatback and a second end portion coupled to the upper portion of the bent portion of the second front cushion; and a second tether having a first end portion coupled to the seatback and a second end portion coupled to the upper portion of the extension portion of the second front cushion, the second tethers of the first and second support tethers intersect each other, and the first tethers of the first and second support tethers are laterally spaced apart from each other.

7. A seat airbag for a vehicle having a seat and a seatback, the seat airbag comprising:
(1) an airbag cushion comprising:
first and second lateral cushions configured to deploy in a forward direction of the vehicle respectively from first and second lateral sides of the seatback;
first and second front cushions configured, when deployed, to extend from a front end portion of the first and second lateral cushions, respectively, toward a space above a center of the seat of the vehicle and be positioned in front of a driver or passenger seated on the seat; and
(2) a plurality of support tethers configured to support the first and second front cushions when the driver or passenger is moved onto the first and second front cushions, the plurality of support tethers comprising:
a first support tether extending from a plurality of upper portions of the first front cushion to a first upper portion of the seatback, or extending from a plurality of lower portions of the first front cushion to a first lower portion of the seatback; and
a second support tether extending from a plurality of upper portions of the second front cushion to a second upper portion of the seatback, or extending from a plurality of lower portions of the second front cushion to a second lower portion of the seatback,
wherein the first support tether comprises:
a cover configured to surround an outer surface of the first front cushion;
an upper support portion extending between an upper portion of the cover and the first upper portion of the seatback; and
a lower support portion extending between a lower portion of the cover and the first lower portion of the seatback.

8. The seat airbag of claim 7, wherein:
the first front cushion includes a bent portion, and
the cover comprises a slit positioned at the bent portion of the first front cushion and extending in a vertical direction.

9. The seat airbag of claim 7, wherein:
the first front cushion comprises:
a bent portion coupled to the front end portion of the first lateral cushion; and
an extension portion extending from the bent portion of the first front cushion toward the space above the center of the seat,
the upper support portion comprises a plurality of upper support portions respectively extending between an upper portion of the bent portion and an upper portion of the extension portion of the first front cushion and coupled to the first upper portion of the seatback, and
the lower support portion comprises a plurality of lower support portions respectively extending between a lower portion of the bent portion and a lower portion of the extension portion of the first front cushion and coupled to the first lower portion of the seatback.

10. The seat airbag of claim 7, wherein:
the first front cushion comprises:
a bent portion coupled to the front end portion of the first lateral cushion; and
an extension portion extending from the bent portion of the first front cushion toward the space above the center of the seat, and
the cover comprises:
a lateral portion configured to cover the bent portion of the first front cushion; and
a front portion configured to cover the extension portion of the first front cushion, and
the upper support portion and the lower support portion respectively extend from the lateral portion and the front portion of the cover in a vertical direction.

11. A seat airbag for a vehicle having a seat and a seatback, the seat airbag comprising:
(1) an airbag cushion comprising:
first and second lateral cushions configured to deploy in a forward direction of the vehicle respectively from first and second lateral sides of the seatback; and
first and second front cushions configured, when deployed, to extend from a front end portion of the first and second lateral cushions, respectively, toward a space above a center of the seat of the vehicle and be positioned in front of a driver or passenger seated on the seat; and
(2) a plurality of support tethers configured to support the first and second front cushions when the driver or passenger is moved onto the first and second front cushions,
wherein the plurality of support tethers has a linear shape and extends toward the airbag cushion at a plurality of different angles, respectively,
wherein the plurality of support tethers comprises:
a main tether having a first end portion coupled to an upper portion of the seatback and a second end portion coupled to a lower portion of the seatback; and
an auxiliary tether disposed adjacent to the main tether and coupled to the airbag cushion, and
wherein the auxiliary tether branches off from the main tether and is coupled to the first front cushion or the first lateral cushion, and an end of the auxiliary tether is connected to the main tether.

12. The seat airbag of claim 11, wherein the auxiliary tether is configured to branch off from the main tether at a side of the driver's or passenger's head and is coupled to the airbag cushion.

13. The seat airbag of claim 11, wherein the first and second lateral cushions are configured to symmetrically deploy respectively from the first and second lateral sides of the seatback.

14. The seat airbag of claim 13, wherein the plurality of support tethers respectively have portions intersecting each other.

15. A seat airbag for a vehicle having a seat and a seatback, the seat airbag comprising:
(1) an airbag cushion comprising:
first and second lateral cushions configured to deploy in a forward direction of the vehicle respectively from first and second lateral sides of the seatback; and
first and second front cushions configured, when deployed, to extend from a front end portion of the first and second lateral cushions, respectively, toward a space above a center of the seat of the vehicle and be positioned in front of a driver or passenger seated on the seat; and (2) a plurality of support tethers configured to support the first and second front cushions when the driver or passenger is moved onto the first and second front cushions, wherein the plurality of support tethers has a linear shape and extends toward the airbag cushion at a plurality of different angles, respectively, wherein the plurality of support tethers comprises:

a main tether having a first end portion coupled to an upper portion of the seatback and a second end portion coupled to a lower portion of the seatback; and an auxiliary tether disposed adjacent to the main tether and coupled to the airbag cushion, wherein the auxiliary tether comprises:

a first portion disposed laterally inwardly of the main tether and coupled to the first front cushion; and a second portion coupled to the first lateral cushion, and wherein the first and second portions of the auxiliary tether are configured to support a load of the passenger in the forward direction of the vehicle or a transverse or diagonal direction of the vehicle.

16. The seat airbag of claim 15, further comprising a reinforcing material positioned at an end of the first portion adjacent to the driver or passenger.

* * * * *